United States Patent
Tang et al.

(10) Patent No.: US 7,353,501 B2
(45) Date of Patent: Apr. 1, 2008

(54) GENERIC WRAPPER SCHEME

(75) Inventors: Qinlin Tang, Redmond, WA (US); Gurbakshish S. Rana, Woodinville, WA (US); Richard Shupak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 10/299,243

(22) Filed: Nov. 18, 2002

(65) Prior Publication Data

US 2004/0098707 A1    May 20, 2004

(51) Int. Cl.
    *G06F 9/44*     (2006.01)
    *G06F 11/00*     (2006.01)

(52) U.S. Cl. .................. 717/130; 717/126; 712/224; 714/38

(58) Field of Classification Search ................ 717/124, 717/126, 130
See application file for complete search history.

(56) References Cited

U.S. PATENT DOCUMENTS

| | | | |
|---|---|---|---|
| 5,485,574 A | 1/1996 | Bolosky et al. | |
| 5,528,753 A | 6/1996 | Fortin | |
| 5,539,907 A | 7/1996 | Srivastava et al. | |
| 5,732,273 A | 3/1998 | Srivastava et al. | |
| 5,790,858 A | 8/1998 | Vogel | |
| 6,026,236 A | 2/2000 | Fortin et al. | |
| 6,263,488 B1 | 7/2001 | Fortin et al. | |
| 6,263,491 B1 | 7/2001 | Hunt | |
| 6,481,008 B1 | 11/2002 | Chaiken et al. | |
| 6,895,578 B1 * | 5/2005 | Kolawa et al. | ............. 717/130 |
| 2002/0152455 A1 * | 10/2002 | Hundt et al. | ................ 717/131 |
| 2003/0037318 A1 * | 2/2003 | Ramasamy et al. | ......... 717/130 |

OTHER PUBLICATIONS

Parson, Dale. "Using Java Reflection to Automate Extension Language Parsing". Bell Laboratories, Lucent Technologies, ACM SIGPLAN Notices, Proceedings of the 2nd conference on Domain-specific languages PLAN '99, ACM Press, vol. 35 Issue 1, Dec. 1999., pp. 67-80, retrieved from ACM/PORTAL.*
Schmitt et al., "ExWrap: Semi-Automatic Wrapper Generation by Example", Aug. 2002, ACM, SIGIR '02, p. 452.*
U.S. Appl. No. 09/343,276, filed Jun. 30, 1999, Srivastava, A. et al., *Application Program Interface for Transforming Heterogeneous Programs*.

(Continued)

*Primary Examiner*—Tuan Dam
*Assistant Examiner*—J. Derek Rutten
(74) *Attorney, Agent, or Firm*—Klarquist Sparkman, LLP

(57) ABSTRACT

A method instruments a function in an executable file so that the instrumented function calls a generic preprocessor prior to execution of the body of the function. After the preprocessor modifies the original function's incoming parameters, the body of the function itself is executed. Finally, execution is directed to a generic postprocessor prior to returning from the function. The postprocessor modifies the outgoing parameters and return value. In one implementation, the parameters of an instrumented function are described and packaged into a descriptor data structure. The descriptor data structure is passed to the generic preprocessor and postprocessor. A generic processor uses the descriptor to select changed behaviors based on the calling context.

20 Claims, 15 Drawing Sheets

OTHER PUBLICATIONS

U.S. Appl. No. 09/503,215, filed Feb. 12, 2000, Niewiadomski, J., et al., *Function Injector*.

U.S. Appl. No. 10/001,280, filed Nov. 1, 2001, Edwards et al., *Application Program Interface for Dynamic Instrumentation of a Heterogeneous Program in a Distributed Environment*.

*The Authoritative Dictionary of IEEE standards terms—$7^{th}$ Edition*, p. 691, Copyright © 2000 by the Institute of Electrical and Electronics Engineers, Inc.

\* cited by examiner

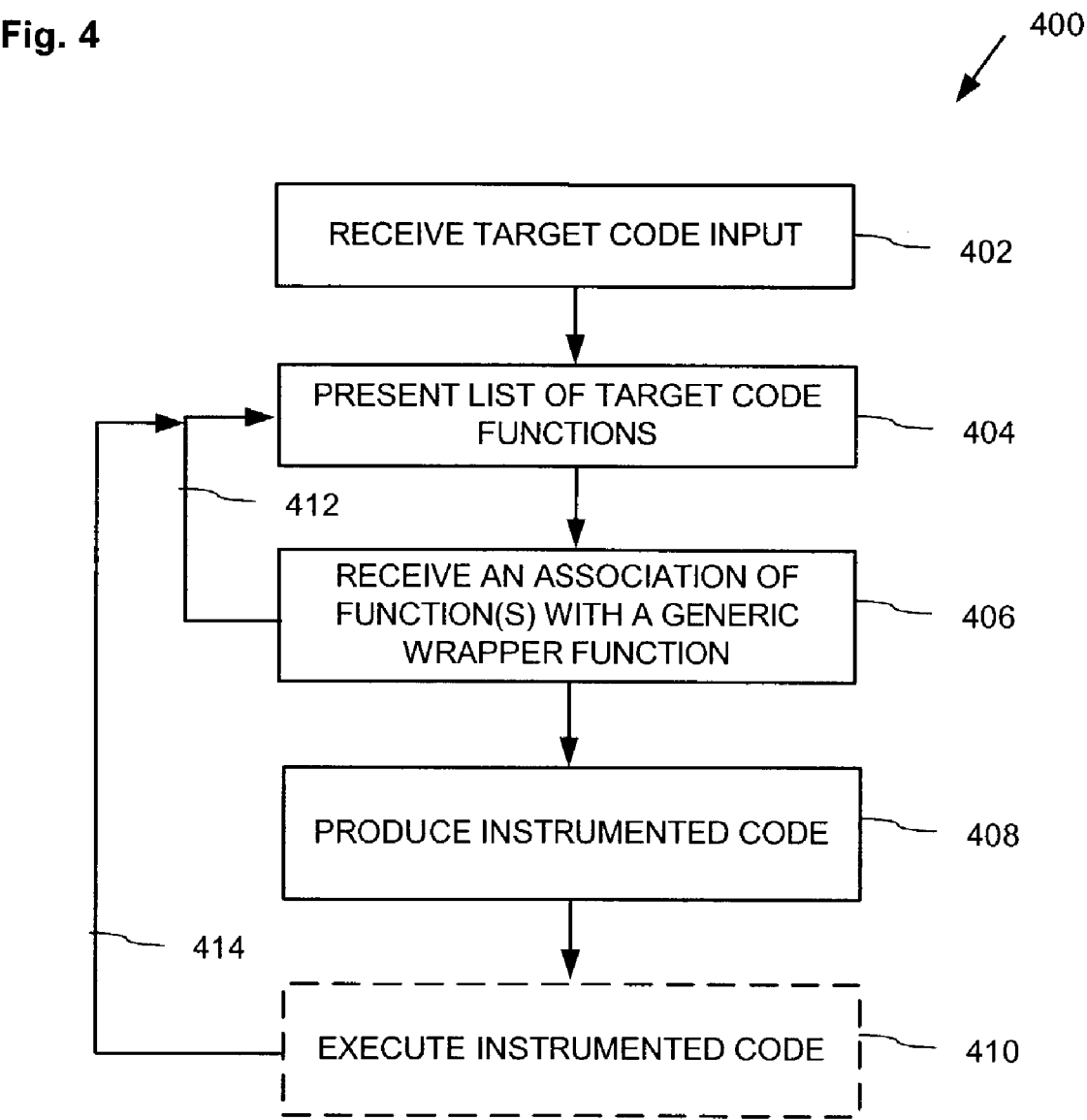

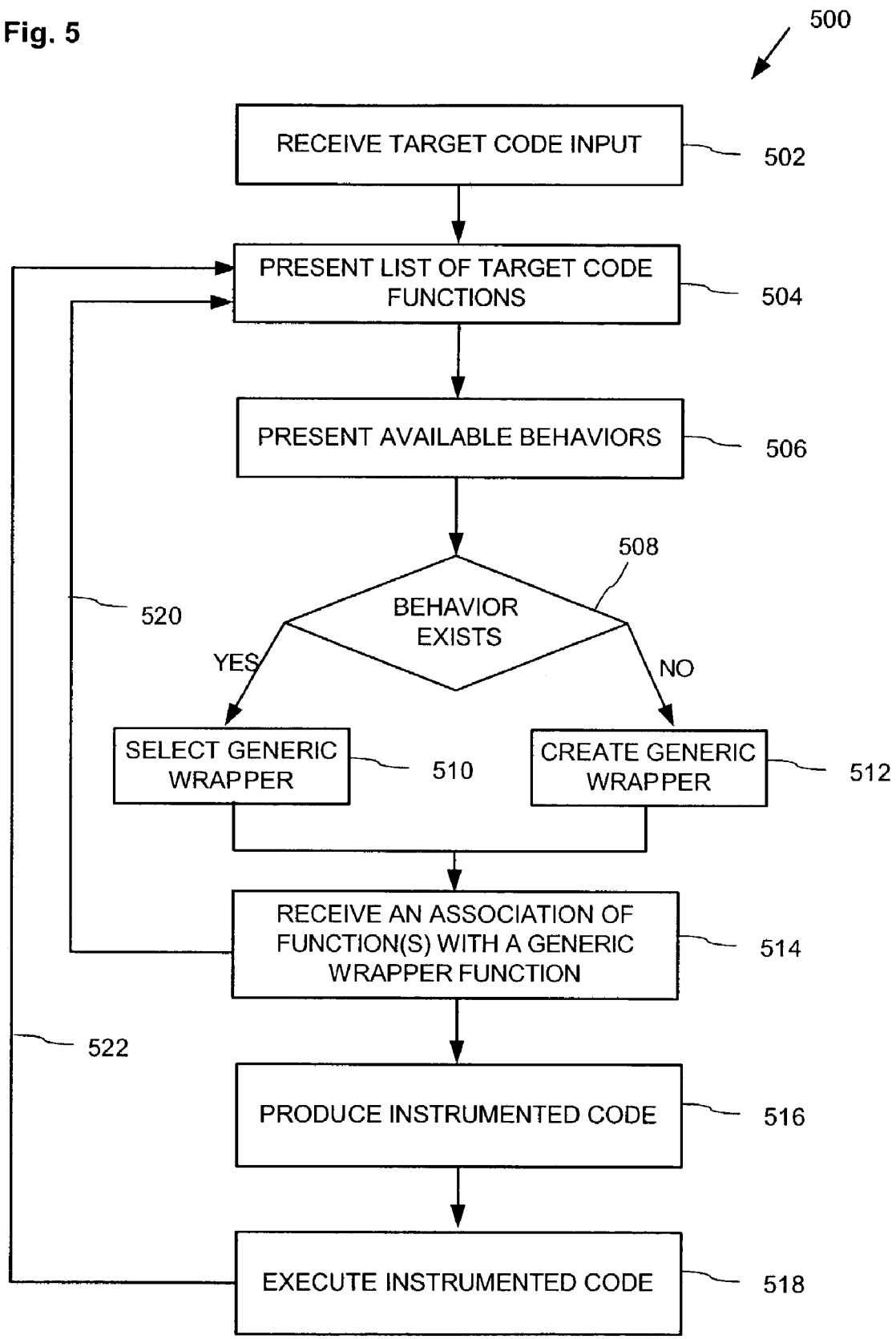

```
Main()        ← 602
{
        checkWeather();    ← 604
};

checkWeather()    ← 616
{
        getTemperature(longitude, latitude);    ← 606
[address 1]   ← 618
        getHumidity(longitude, latitude, elevation);    ← 608
};

getTemperature(real longitudeinput, real latitudeinput)
{
    body of getTemperature;
    return real retVal;    ← 610                              ← 614
};

getHumidity(real longitudeinput, real latitudeinput, int elevationinput)
{
    body of getHumidity;    ← 612
    return real retVal;
};
```

Fig. 7

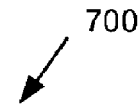

```
getTemperature(real longitudeinput, real latitudeinput)
{
        generic_preprocessor(pParam);      ← 702
        body of getTemperature;            ← 704
        generic_postprocessor(pParam);     ← 706 return real retVal;                ← 708
};
```

Fig. 8

```
getHumidity(real longitudeinput, real latitudeinput, int elevationinput)
{
        generic_preprocessor(pParam);      ← 802
        body of getHumidity;               ← 804
        generic_postprocessor(pParam);     ← 806
        return real retVal;                ← 808
};
```

Fig. 9

```
                        918
                        ⌣
      generic_preprocessor(ParamDescriptor *pd)
      {
          if pd.function == getTemeprature then  ←— 902
              if pd.longitude >= 30 then     ←———— 904  ⎱
920               throw longitude_exception; ←—— 906  ⎰ 908 if pd.function == getHumidity then ←—— 910
              if pd.elevation >= 12000 then  ←——— 912  ⎱
                  throw elevation_exception; ←—— 914  ⎰ 916
      };
```

Fig. 10

```
                        1014
                         ⌣
      generic_postprocessor(ParamDescriptor *pd)
      {
          if pd.function == getTemeprature then   ←—1002
              if getTemperature.retVal >= 130 then ←—1004
1016          throw temperature_exception;   ←—1006 if pd.function == getHumidity then   ←—1008
              if getHumidity.retVal > 100 then ←— 1010
                  throw humidity_exception;    ←—1012
      };
```

Struct ParamDescriptor ←— 1102
{
    FunctionName function; // name of the function parameter belongs to ←—1104
    Name name; // name of the parameter ←—1106
    Type type; // type of the parameter ←—1108
    ParameterAddress paraAddr; // the address of the parameter ←— 1110
};

Struct ParameterDescriptor ←—1208
{
    Name name; // name of the parameter ←—1210
    Type type; // type of the parameter ←—1212
    ParameterAddress paraAddr; // the address of the parameter ←—1214
};

Struct FunctionDescriptor ←—1202
{
    FunctionName function; // name of the function ←— 1204
    array [ ] ParameterDescriptor arrayP; // array of parameters ←—1206
};

Fig. 14

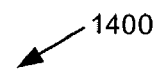

```
getTemperature(real longitudeinput, real latitudeinput)
{
        generic_preprocessor(pParam);    ←—1402
[address 2]  ←—1404
        body of getTemperature;  ←—1406
        return real retVal;  ←—1408
};
```

Fig. 15

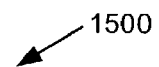

```
generic_preprocessor(ParameterDescriptor *pParam)
{
        Create a shadow stack frame;  ←—1502
        Replace the return address with the current shadow stack pointer;  ←—1504
        Preprocess incoming parameters prior to executing wrapped body;  ←—1506
};
```

Fig. 16  /1600

```
push pParam   // pParam contains pointer to getTemeprature's parameter descriptor  ←—1602
push eax      // eax register contains the first part of getTemperature's return value ←—1604
push edx      // edx register contains the second part of return value ←—1606
push pSS      // stores current shadow stack pointer ←—1608
push getTemperature's return address ←—1610
jmp  generic_postprocessor ←—1612
```

Fig. 17  /1700

```
generic_postprocessor(ShadowStack *pSS, _int64 retVal, ParameterDescriptor *pParam)
{
    Delete the current shadow stack frame; ←—1704
    Do the post-processing of getTemperature's outgoing parameters and return value;
    return retVal; ←—1708                                                    ↖1706
};
```

GENERIC WRAPPER SCHEME

TECHNICAL FIELD

This invention relates to testing programs, and more specifically, to injecting code into programs in order to monitor or change program behavior.

BACKGROUND AND SUMMARY

There is a desire to monitor or intercept running programs and change program behavior in order to identify potential future failures, diagnose program problems or increase program performance (hereafter, "changed behavior"). For example, in the field of testing, an attempt is made to exercise software in as many ways as possible, in order to catch as many programming errors as possible before releasing the software for general use. Further, it may be advantageous to inject a failure into a program to change its behavior. It may also be helpful to change behaviors without having to rebuild the program before running it again.

It may be advantageous to change or monitor the intended behavior of an executing computer program (i.e., changed behaviors). For example, a computer program is tested using a number of conventional methods, including artificially simulating a fault condition by stepping through the executable in a debugger and manually changing the instruction pointer or memory value, modifying the source code by introducing debug statements or functions into the program and observing the results during program execution, or limiting system resources and observing the program behavior under low system resource conditions.

A technology called an injector tool, inspects a program and looks at its entry and exit points (e.g., basic blocks or functions; hereafter "functions"). The injector tool employs one of the computer program testing techniques by redirecting a function to a user-supplied function. See (1) Niewiadomski, J., et al., Function Injector, U.S. patent application Ser. No. 09/503215, filed Feb. 12, 2000; (2) Hunt et al., Heavyweight and Lightweight Instrumentation, U.S. Pat. No. 6,263,491, filed Nov. 20, 1998; (3) Edwards et al., Application Program Interface for Dynamic Instrumentation of a Heterogeneous Program in a Distributed Environment, U.S. application Ser. No. 10/001280, filed Nov. 1 2001; (4) Srivastava, A. et al., Application Program Interface for Transforming Heterogeneous Programs, U.S. application Ser. No. 09/343,276, filed Jun. 30, 1999; (5) Chaiken, R. et al., Instrumentation and Optimization Tools for Heterogeneous Programs, U.S. Pat. No. 6,481,008, issued Nov. 12, 2002; (6) Keith Vogel, Method and System for Selecting Instrumentation Points in a Computer Program, U.S. Pat. No. 5,790,858, issued Aug. 4, 1998, all of which are incorporated herein by reference.

A test designer decides which function's behavior to change. An injector instruments each selected function, with an associated user-selected function with the same signature as the original function. When the instrumented functions are later executed, the changed behavior is executed instead of (or in addition to) the original functions behavior. For each selected function to be instrumented, a user selected function is executed thereby implementing the changed behavior instead of the original behavior. For example, one testing technique is redirecting a function to a user-supplied function, called a wrapper function, and the user-supplied function is able to invoke the redirected function (i.e., the original function). The problem with this prior arrangement was that each entry and exit point of the original function typically has a unique signature. So, in order to change behavior for a function, a new function had to be created with the same signature. In that case, when 1000 functions with unique signatures are selected for changed behavior (e.g., a test behavior), 1000 changed functions must be created matching each unique signature.

A signature is the combination of the function name, the parameters to the function, and the return value. The redirect function needs to look the same in terms of the signature as the original function, so it is plug-compatible. After this plug-compatible signature is injected into the original code, calls to the original function are directed to the plug-compatible function. In order to instrument 200 functions, 200 plug compatible functions would be created.

For example, if a function being redirected has a certain signature, with three input parameters, and a return value. The input parameters have certain data types, for example, lengths and type. The redirected function needs to have the same type signature. FIG. 1, shows two example functions 100 called "swap" 102 and "order" 104. Swap 102 has two input parameters, "a" and "b" which are "int" (integer) types, and a return value, which is also an "int" type. Order 104 has two input parameters, "name1" and "name2" which are pointers to strings, and an output value which is a boolean value. In order for a function to be redirected to another function, it must contain the same signature. As shown in FIG. 2, "swap'" (pronounced "swap prime") 202 and "order'" 204 have the same signature as "swap" 102 and "order" 104. Thus, they have the same number, type, and order of input parameters, and the same return values.

As shown in FIG. 2, executable instructions 206, 210, can be added to the redirected function to perform changed behavior. For example, if the function is being redirected for testing, the changed behavior may include test behavior. A test behavior could for example, run the original code 108 in most cases, but fail the function 202 by performing the changed behavior 206 of throwing an exception, every tenth time the redirected function is executed. In another testing example, the changed behavior 206, 210 may merely observe the state of an executing function (e.g., log a function's state information to disk, or view a function's state through a debugger). In another example, an original function may read or write to disk, and a redirect function may pretend that a disk read or write failed, in order to test exception handling. In another example, all input values and output values are saved for analysis. Many types of changed behaviors (e.g., tests) are known to those skilled in the art.

The redirected swap function 202 may include a portion of the original swap body 108, or may just include the change behavior 206. By using a code injector, any call to "swap" 102 in the programs binary code could be replaced with a call to "swap'" 202 without re-compiling the program. An injector tool will perform this injection after the build of the program containing "swap" 102 and "order" 104. An injection tool is used to instrument the binary with changed behavior instead of modifying and recompiling the source code. The code could also be injected at run-time while the original binary code is executing. In this example, for each redirected function, a test developer was required to write a matching signature 202, 204 and write code 206, 210 within each redirected signature 202, 204, to implement the change behavior. This newly written code needs to be compiled, so when pointers to it are injected in the original binary code, it is ready to execute.

As shown in FIG. 3, there are also tools that generate the signature for one or more identified redirect functions. The tool would provide the signatures 302, 304, and a test designer would then write the code 306 to create the desired change behavior within the function. In this example, for a redirected function 102, 104, the tool creates the matching signature 302, 304 (and possibly a copy of the original body), but the test developer is required to write code 210 within each signature 306, to implement the change behavior. This newly written code needs to be compiled, so when pointers to it are injected in the original binary code, it is ready to execute.

The present invention is directed towards providing a function, that executes regardless of the signature of a function whose behavior it changes. Such a generic function changes behavior for plural functions. In one implementation, a generic wrapper function, could be used to change the behavior of many original functions. Of course, a generic wrapper function could be used in conjunction with the conventional wrappers described above. However, for groups of functions using a generic wrapper function, time is saved since a unique signature function need not be created for each. For example, if a generic wrapper function is used to change the behavior of 100 selected functions (associated functions), then 100 separate signatures don't have to be created. This saves time since one or a few generic wrapper functions can be created that contain the desired changed behaviors.

In another respect, a generic wrapper function can be built that performs a set of redefined functions. Such a pre-built wrapper function could be used to test a set of predefined criteria. This pre-built wrapper function is beneficial since a specific test developer, may not have the knowledge to create an equivalent function in which to do the redirection. Thus the generic wrapper function expands the type of problems test developers can address, and expands who will be able to use the technology. For example, in logging, a set of canned solutions can be provided to a test developer, and selected for test. In one embodiment, these canned solutions have already compiled binaries available for certain common behaviors. In this respect, the test developer doesn't need to write the code to implement the desired changed behavior, nor compile the source code. For example, a canned generic wrapper function behavior logs a trace of a sequence of executing functions in a program. The log includes parameter values from the executing functions which is useful for diagnosing problems in a live environment, while the program is running. This is valuable because many problems only surface in a live environment. Such a canned generic wrapper behavior outputs these values to the log file. Another canned generic behavior arbitrarily injects failures in the return value of selected functions. Such a canned generic wrapper behavior is useful to bring an instrumented program into a state where failures are more likely to be exposed. A test developer selects multiple functions to be wrapped with a canned generic wrapper function behavior.

In a further respect, a descriptor describes a context of the original function (e.g., function name, function address, parameter names, parameter types, parameter values, etc.). If a generic wrapper function performs a changed behavior that is ,dependent on the context of the original function, then the descriptor can be used to determine which of the plural changed behaviors to perform.

In yet another implementation, a generic wrapper function includes behavior executed before execution of the body of the original function (preprocessing), and includes behavior executed after execution of the body of the original function (postprocessing). In one such implementation, a call to a preprocessing generic wrapper function is inserted (e.g., injected) in the original function before the function body, and a call to a postprocessing generic wrapper is inserted in the original function just before each return instruction in the original function. In another such implementation, only a call to the preprocessing generic wrapper function is inserted in the original function, and instructions in the preprocessor replace a return address in the stack frame with the postprocessing address, so upon return from executing the body, control flow is automatically sent to postprocessing. In yet another implementation, only one call to the generic wrapper function is inserted in the original function body. However, the call includes an address of the original function, that can be used by the generic wrapper function to execute the original function body or obtain other information about its calling context.

In yet another respect, a method instruments a function in an executable file so that the instrumented function calls a generic preprocessor prior to execution of the body of the function. After the preprocessor modifies the original function's incoming parameters, the body of the function itself is executed. Finally, execution is directed to a generic postprocessor prior to returning from the function. The postprocessor modifies the outgoing parameters and return value. In one such implementation, during instrumentation of target functions in the executable file, the parameters of an instrumented function are described and packaged into a descriptor data structure. The descriptor data structure is passed to the generic preprocessor and postprocessor. At runtime, a function parameter and other function values or references can be obtained through the descriptor data structure.

Additional features and advantages will be made apparent from the following detailed description of the illustrated embodiment which proceeds with reference to the accompanying drawings.

BRIEF DESCRIPTION OF THE DRAWINGS

FIG. 4 is a flow chart for a method of instrumenting functions with generic wrapper functions.

FIG. 5 is a flow chart for a method of instrumenting functions with selected or created generic wrapper functions.

FIG. 6 is an example psuedo-code target code used to illustrate plural generic wrapper function implementations.

FIGS. 7 and 8 are psuedo-code examples of functions instrumented with generic wrapper function calls before and after the function body.

FIGS. 9 and 10 are examples of psuedo-code generic wrapper functions with call context dependent changed behavior.

FIGS. 11 and 12 are psuedo-code examples of descriptor data structures.

FIG. 14 is a psuedo-code example of a function instrumented with a single injected call to a generic wrapper function used in shadow stack hooking.

FIG. 15 is a psuedo-code example of a preprocessor generic wrapper function using shadow stack hooking.

FIG. 16 is psuedo-code assembly language instructions used to prepare the call stack for a postprocessing generic wrapper function.

FIG. 17 is psuedo-code for a generic postprocessing wrapper function.

DETAILED DESCRIPTION

Figure 1:
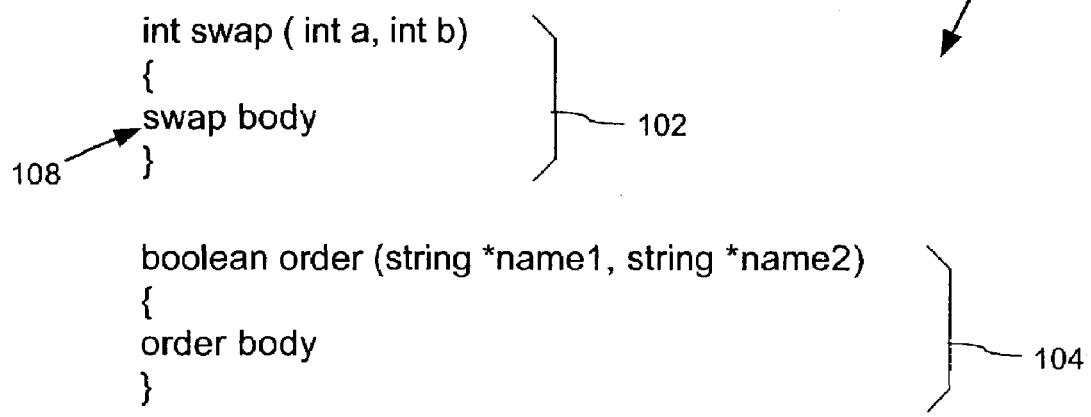
FIG. 1 is a psuedo-code example of two conventional functions and their signatures.
Figure 2:
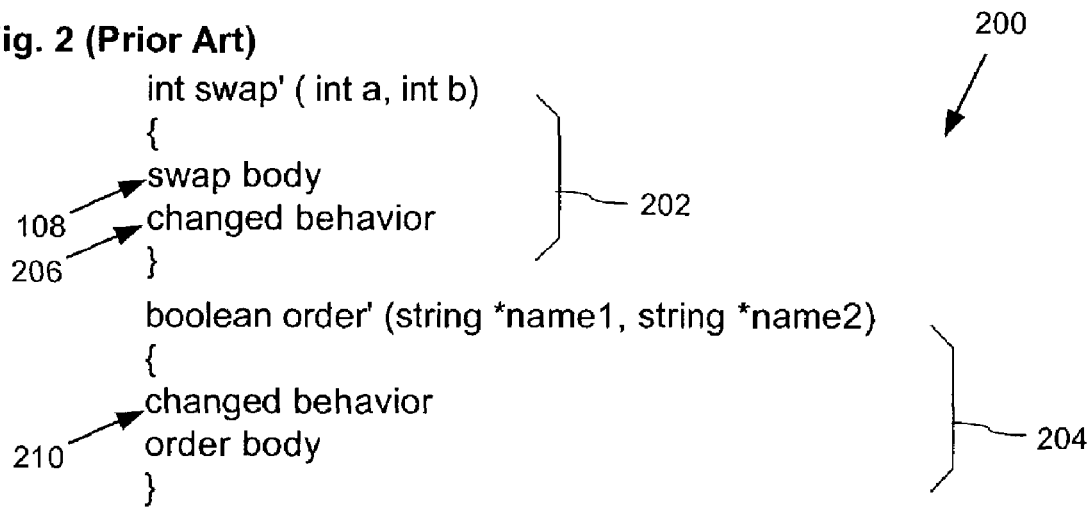
FIG. 2 is a psuedo-code example of a conventional wrapper function.
Figure 3:
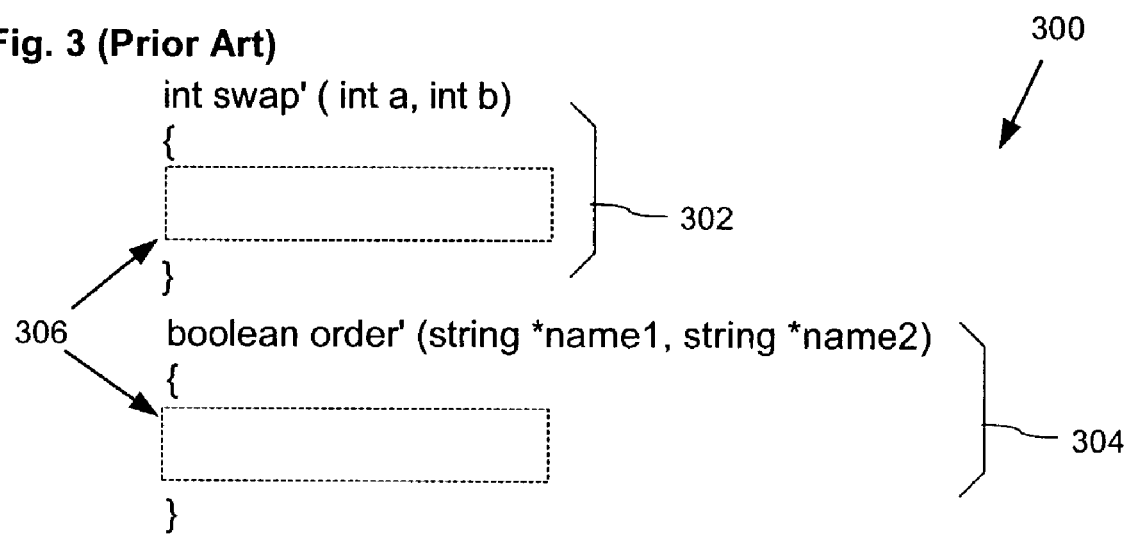
FIG. 3 is a psuedo-code example output of a conventional tool that creates conventional wrapper function signatures.

The following is a detailed description of a few methods and systems for implementing a generic stack scheme according to the invention.

FIG. 4 is a block diagram of a computer implemented method 400. For example, the method may be a method performed by an computer implemented instrumentation tool. An instrumentation tool is used, for example, to instrument an original function with certain test behaviors. The method receives an input 402 in the form of source code, intermediate code or binary code (e.g., target code). If the target code input is compiled or interpreted (e.g., binary code or intermediate code), an injection tool is used to instrument the target code, and behavioral changes can be made more rapidly to the target code without re-compiling each time, though this is not required. The instrumentation tool identifies in the target code and presents to a user 404, a list of functions (e.g., procedures, methods, basic blocks, etc.). The method then receives an indication of an association 406. The indication is an association of a function to be instrumented (or of a group of functions to be instrumented) with a generic wrapper function 406. The method receives the association and produces an instrumented code 408, which includes the changed behavior of the generic wrapper function. Optionally, at some future time, the program comprising the instrumented code is executed 410, and when one of the instrumented functions is executed, the changed behavior is executed. The changed behavior may execute instead of, or in addition to, portions of the instrumented function, depending on the purpose and control flow of the changed behavior and the original function. Selecting function(s) and associating them with generic wrapper functions may be accomplished 406 over multiple iterations 412. Further, as changed behavior of an executing program 410 is observed or monitored, a method user may decide to further instrument the program 414. Thus the process of observing the changed behavior and updating or changing instrumented functions with new or changed behaviors may also be take place over several iterations 414.

In one embodiment, generic wrapper functions are user-supplied functions, in another embodiment, the generic wrapper functions are selected by the user from a library of available generic wrapper functions. The library of available generic wrapper functions may include functions supplied by a user in a previous session using the method 400, 500. Other generic wrapper functions in the library may include functions included with the instrumentation tool, or added in a tool update. Conceivably, once generic wrapper functions become known in the arts, third party developers may provide generic wrapper function component libraries (or code segments providing changed behaviors that can be pasted into generic wrapper functions). Libraries could contain generic wrapper functions from any source.

FIG. 5 is a block diagram of a computer implemented method of instrumenting target code 500. The method receives a target code input 502. The method identifies functions in the target code and presents a list of functions 504 to the user. The method then presents available behaviors (e.g., existing generic wrapper functions) to the user 506. If a desired behavior exists 508, then it is selected by the user 510. The method then receives the association of the selected function (or group of functions) with a selected generic wrapper function 514. If a desired behavior does not exist, a user creates a generic wrapper function 512. Creating a generic wrapper function comprises coding desired behavior (e.g., writing source code), or pasting in code (e.g., source code) that implements a desired behavior(s) and compiling that code so it can be injected into the program of the target code. After the generic wrapper function is created 512, the method then receives the association of the selected function (or group of functions) with the created generic wrapper function 514. After a generic wrapper function is selected or created, and associated with selected functions, the method receives the association and produces instrumented code 516, which includes the changed behavior of the generic wrapper function. At some future time, the program comprising the instrumented code is executed 518, and when one of the instrumented functions is executed, the changed behavior is executed. The changed behavior may execute instead of, or in addition to, portions of the instrumented function, depending on the purpose and control flow of the changed behavior and the original function. Selecting function(s) and associating them with generic wrapper functions may be accomplished over multiple iterations 520. Further, as changed behavior of an executing program is observed or monitored, a method 500 user may decide to further instrument the program. Thus the process of observing the changed behavior and updating or changing instrumented functions with new or changed behaviors may also take place over several iterations 522.

A function may be instrumented with a generic wrapper function in several ways. In order to illustrate ways of utilizing generic wrapper functions, example (pseudo) target code 600 is shown in FIG. 6. Function Main( ) 602 is a simple program that calls only the function "checkWeather( )" 604. Function checkWeather( ) 604 calls two functions, "getTemperature" 606 and "getHumidity" 608. The body of getTemperature 610 calculates the temperature for an input longitude and latitude, and returns the calculated temperature. The body of get humidity 612 calculates the humidity at a given location and elevation and returns the humidity. This example target code is used to illustrate several ways that a generic wrapper function can instrument an original function to add changed behaviors.

From an implementation perspective, there are several alternatives to perform a function of hooking control flow for a generic preprocessor and/or postprocessor. The term hooking is used to describe altering the control flow of an original function to execute changed behaviors implemented by a generic wrapper function. A generic preprocessor is any changed behavior that is implemented by an executing generic wrapper function before any execution of the original function's body. A generic postprocessor is any changed behavior that is implemented by an executing generic wrapper function after execution of the original function's body. For a given generic wrapper function and its associated control flow, the original functions body may not be executed. Further, for a given wrapped control flow, it is not necessary for both the generic preprocessing and the generic postprocessing to be performed. For example, a preprocessor could simply just throw an exception every third time a function is called. In another example, a postprocessor could simply change the function output values regardless of what the original function body computed, if indeed the original body was allowed to execute at all in the wrapped control flow.

FIG. 7 is one implementation of hooking control flow to execute a generic wrapper function. In this implementation, a function selected in the target code 614 is instrumented (as discussed in FIG. 4, 408, and FIG. 5, 516) to include a call to a "generic_preprocessor" 702 function and a "generic_postprocessor" 706. The call to the "generic_preprocessor" 702 and the "generic_postprocessor" 706 is injected into the target code to produce an instrumented code version of "getTemperature" 700. In such a case, when getTemperature is called, the injected "generic_preprocessor" function 702 is called and executed before the body of getTemperature 704, and the "generic_postprocessor" is called and executed after the body of getTemperature is executed.

In FIG. 8, "gethumidity" 800 is instrumented in the same way as "getTemperature" 700. As shown, when "gethumidity" 800 is executed, the injected "generic_preprocessor" function 802 is called and executed before the body of getTemperature 804, and the "generic_postprocessor" 806 is called and executed after the body of getTemperature is executed. One of the benefits of a generic wrapper function is that a unique function does not need to be written for each selected original function. This is evident from the FIG. 7 and FIG. 8; because both instrumented functions 700, 800 are calling the same generic wrapper functions (i.e., generic_preprocessor 702, 802; generic_postprocessor 706, 806).

FIGS. 9 and 10 are pseudo-code examples of possible generic wrapper functions called from both "getTemperature" 700 and "getHumidity" 800. The name generic wrapper function implies (among other things) that a given generic wrapper function can wrap changed behavior for more than one original function thereby creating several instrumented functions. Here, a same generic wrapper function (i.e., "generic_preprocessor" 900), is called from two instrumented functions, respectively "getTemperature" 702 and "getHumidity" 802. Further, a same generic wrapper function (i.e., "generic_postprocessor" 1000), is called from two instrumented functions, respectively "getTemperature" 706 and "getHumidity" 806. In this implementation, a generic wrapper function 900 determines which function called it 902, in order to determine which changed behavior 908, 916 to execute. The generic_preprocessor 900 throws a longitude exception 906, if an input parameter to the getTemperature function 902 exceeds a defined value 904. In this case, the generic wrapper function implements a changed behavior in the form of throwing an exception 908 that was not in the original target code. The generic wrapper function 900, throws an elevation_exception 914, if an elevation input parameter of the "getHumidity" function 910 exceeds twelve thousand feet 912. In this case, the generic wrapper function implements a changed behavior in the form of throwing an exception 916 that was not in the original target code. Finally, a generic wrapper function (i.e., "generic$_{13}$ postprocessor" 1000) implements changed behavior that checks the return values of plural instrumented functions. In this implementation, an exception is thrown 1006, if a return value 1004, for an instrumented function (i.e. "getTemperature" 1002) exceeds a threshold temperature of 130 degrees 1004. In this implementation, an exception is thrown 1012, if a return value 1010, for an instrumented function (i.e. "getTemperature" 1008) exceeds a threshold humidity of 100 percent 1010.

A shown in FIGS. 9 and 10, in this implementation, a generic wrapper function receives as input 918, 1014, a pointer to a call source descriptor structure. A call source descriptor structure ("descriptor structure") contains information used by a generic wrapper function to determine the changed behavior to implement. For example, in the "generic_preprocessor" 900, a generic wrapper function 900, uses a descriptor structure pointer 920 to determine which behavior to execute. In the "generic_postprocessor" 1000, a generic wrapper function 1000, uses a descriptor structure pointer 1016, to determine which behavior to execute. These descriptor structure pointers 920, 1016 reference information in the descriptor structure that describes or identifies the call source context. The generic wrapper function uses this context information to determine what behavior to implement.

FIG. 11 is one implementation of a call source descriptor data structure 1100. This descriptor structure is a parameter descriptor 1102. For parameter in the call context, the descriptor identifies the function name 1104 that the parameter belongs to, the name of the parameter 1106, the data type of the parameter 1108, and an address where the parameter is stored 1110. Thus, a generic wrapper function 900 passed a pointer to an instance of this parameter descriptor type 918, can use knowledge of this descriptor structure to determine the function calling 902 the generic wrapper function, in order to determine a behavior to implement 908.

FIG. 12 is another implementation of a descriptor data structure 1200. This descriptor structure is a function descriptor 1202. This descriptor structure identifies for a given function name 1204, an array (or linked list) of parameter descriptors 1206. Each element of the array (or linked list) is a data structure 1208 that describes one of the parameters of the function 1204. An element 1208 indicates the parameter name 1210, the parameter type 1212, and the parameter address 1214. A generic wrapper function passed a pointer to this function descriptor 1202, will have information necessary to identify the context of the calling instrumented function and its parameter data.

Figure 13:
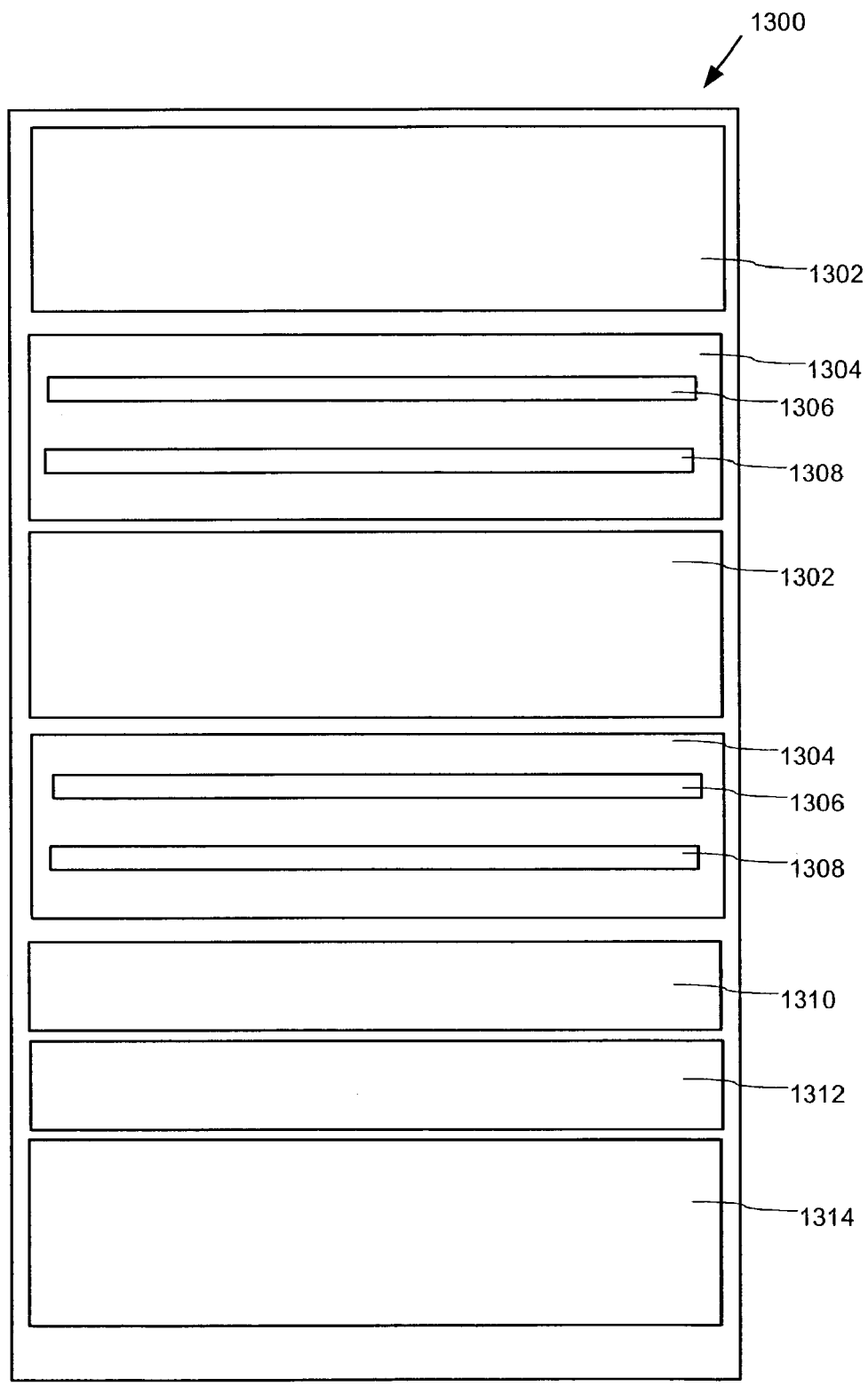
FIG. 13 is an exemplary diagram of an implementation of binary code with instrumented functions, injected calls, and descriptor tables.

FIG. 13 is an illustration of one implementation of instrumented code (e.g., FIG. 4, 408; FIG. 5, 516) using a preprocessor and postprocessor implementation of generic wrapper functions 700, 800. The instrumented code is a binary code 1300 containing target code of functions not selected to be instrumented 1302. The instrumented code also contains at least two functions 1304, that are instrumented. In this embodiment, each instrumented function 1304 contains a preprocessor call 1306 to a generic wrapper function 1310, and a postprocessor call 1308 to a generic wrapper function 1312. When the instrumented code is produced 408, 516, the calls 1306, 1308 to the generic wrapper functions 1310, 1312, are injected into the functions selected for instrumentation 1304. Further, the generic wrapper functions are linked into the instrumented code along with tables or other storage 1314 holding the descriptor structures 1100, 1200. Thus, the pointers to the descriptor structures 918, 920, 1014, 1016, can access function and parameter information 1314 at run time. In some cases, it is best to keep this descriptor information 1314 on a heap (or other memory) so it remains available. The binary code 1300 may all be in one file, or may include portions (e.g., components, methods, memory pages, etc) that are obtained from a library and linked as needed (e.g., DLL).

In the generic preprocessor and generic postprocessor wrapper function implementation of FIGS. 7 and 8, the call stack is used to maintain state information about a generic_preprocessor or generic_postprocessor when it is called, because at that time, it remains the activated frame. This makes sense in simple cases when an instrumented function 700, 800 has only one or a few return instructions 708, 808. This is because a generic_postprocessor call must be injected before each return instruction 708, 808. However, the following hooking implementation may be better in some cases, for example, when an instrumented function has plural exit points (i.e., plural return instructions in a single instrumented function). In that case it may be difficult to inject multiple postprocessing calls into the function.

In this implementation, a shadow stack is used to implement hooking for a generic wrapper function. As shown in FIG. 14, a call to a generic preprocessor function 1402 is inserted into the target code at the original function "getTemperature" 1400. In this implementation since the call to a generic post processor is not inserted into the function 1400, the hooking is accomplished as described. The generic preprocessor 1500 shown in FIG. 15, performs the following three tasks. First, it creates a shadow stack frame 1502. The term "shadow stack frame" is used to describe a sequence of instructions that push the parameters of the generic postprocessor onto the stack, and then redirects the control of execution to jump to generic postprocessor function. (An example of this sequence of instructions is described with reference to FIG. 16). Second, the generic preprocessor modifies the stack to replace the return address 618 in the stack frame associated with "getTemperature" with the current shadow stack pointer 1504, so that the control flow will be redirected to execute the generic postprocessor function after the body of "getTemperature" 1406 is executed, when the return instruction 1408 is executed. (An example stack transformation is discussed with respect to FIG. 18). Finally, the generic preprocessor performs any necessary incoming-parameter processing or other behavioral changes 1506 prior to returning to execute the body of getTemperature 1406.

Before the generic preprocessor 1500 executed, the stack frame for "getTemperature" had a return address ("return address 1" 618, FIG. 6) to its calling function 616. During execution of the generic preprocessor, this return address was replaced with the address of the shadow stack pointer 1504, so when the return instruction 1408 is executed, control flow executes the sequence of instructions where the shadow stack pointer points.

As shown in FIG. 16, an implementation of a sequence of instructions 1600 in a shadow stack is shown. The shadow stack (not shown) is a code stack, where a sequence of the shadow stack frames are dynamically constructed and destructed during the code execution. Each shadow stack frame on the shadow stack contains the following assembly instructions. The instructions may vary depending on the return value of the wrapped function and the computer architecture. In this example, the wrapped function is "getTemperature" 1400. However, a shadow stack containing executable instructions is separate from the call stack which contains state information.

Since a pointer to this sequence of instructions 1600 (shadow stack frame of the shadow stack) has been stored in place of getTemperature's return address, when the return instruction is executed 1408, the shadow stack sequence of instructions 1600 begin executing. First, a pointer to the descriptor data structure is pushed 1602 onto the call stack. Then the return value from the wrapped body is pushed onto the call stack 1604, 1606. Then the pointer to the shadow stack is pushed 1608 onto the call stack. Finally, the wrapped function's return address 618 is pushed 1610 onto the call stack. Finally, execution continues 1612 at the generic postprocessor. Note that getTemperature's return address was on the call stack when the generic preprocessor began executing. However, during execution of the generic preprocessor, getTemperature's return address is replaced by the current shadow stack pointer, and getTemperature's return address is saved in the shadow stack frame. Thus, getTemperature's return address (address 1) can be pushed on the stack later as shown 1832.

After creating a shadow stack frame 1502, the next thing the generic preprocessor function does is replace the return address of "getTemperature" (labeled as "address 1" 618 in "checkWeather" 616) with a pointer to the current shadow stack 1504. So after the body getTemperature 1406 has executed, the control flow will go to execute the instructions 1600 in the shadow stack frame, instead of executing "getHumidity" 608 at "address 1" 618. By executing the instructions in the shadow stack frame, the parameters of the generic postprocessor and the return value of "getTemperature" 1610 are placed onto the call stack 1602-1610. Thus, the call stack is in the state required to begin processing 1612 the generic postprocessor.

As shown in FIG. 17, pseudo-code 1700 of a generic post processor is described. Once the call stack state is prepared to begin executing post processing 1600, this shadow stack frame's use is complete, so it can be deleted. Thus, the generic post processor first deletes the current shadow stack frame 1704. Next, the post processor processes any required behavior changes which may include monitoring or changing "getTemperature's" outgoing parameters and or return values 1706. Finally, the return instruction 1708 cleans up the call stack and returns control to the original return address of getTemperature ("address 1") 618.

Thus, after executing function the generic_postprocessor 1700 and any associated changed behavior, the getTemperature's return address is popped out of the stack, the control flow returns back to the "address 1" 618, where "getHumidity" 608 is executed.

Figure 18:
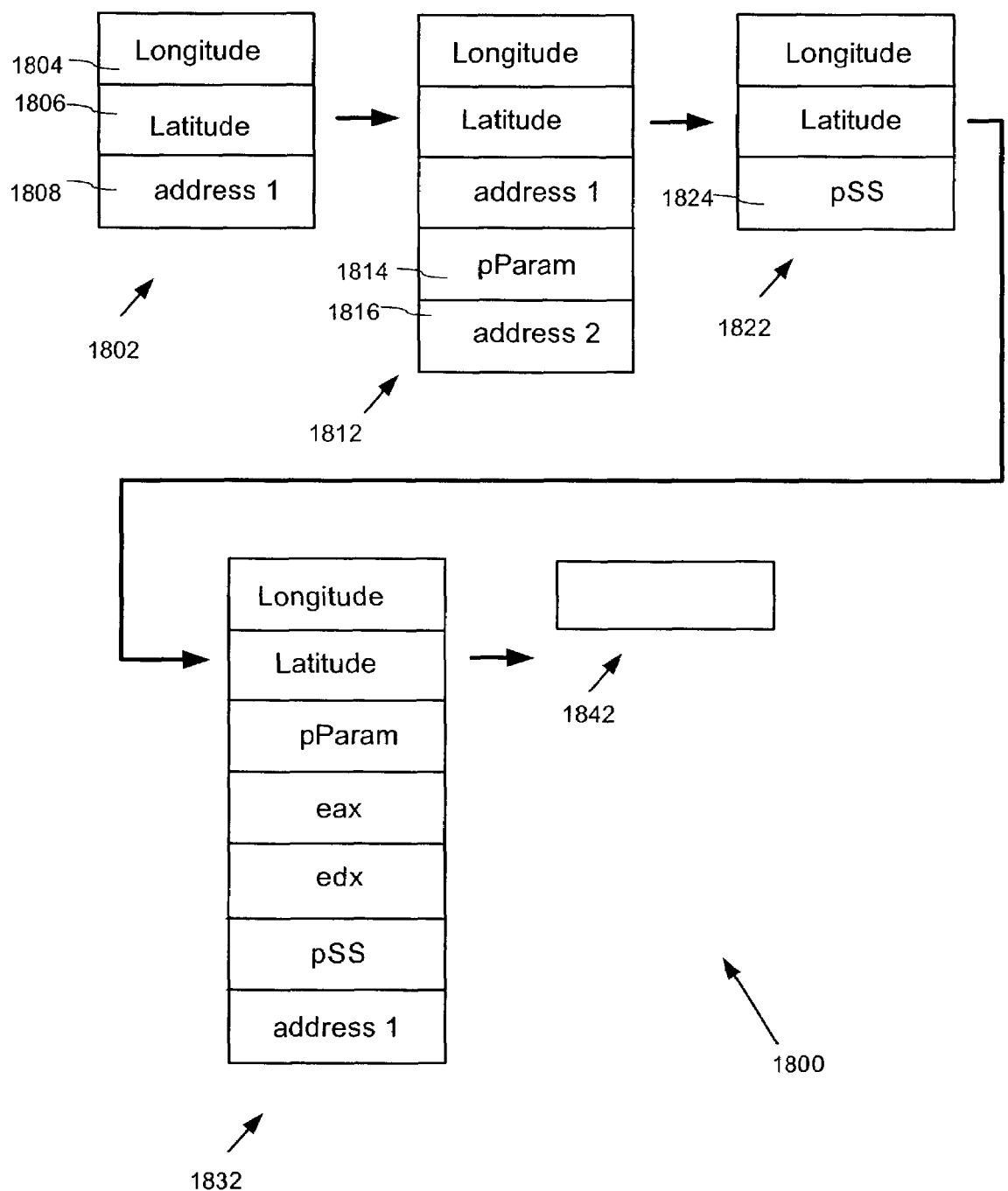
FIG. 18 is an exemplary call stack transformation.

FIG. 18 demonstrates the progress of the call stack 1800 during an exemplary hooking process for a generic wrapper function using the method discussed in FIGS. 14-17. In this example, when "getTemperature" 606 is called, the executable code stores the two input parameters longitude 1804 and latitude 1806 on the call stack 1802. Additionally, the executable code pushes the return address—"address 1" 1808, of the calling context 618 onto the call stack. Before execution jumps to the first instruction of an instrumented version of "getTemperature" 1400, the call stack state is as shown at 1802.

Upon executing in "getTemperature" 1400, the executable code for the generic preprocessor call 1402, pushes a pointer to the input parameter—"pParam" onto the call stack 1814, and then pushes the return address—"address 2" 1816, of the calling context 1404 onto the call stack. Before execution jumps to the generic preprocessor, the call stack appears as shown at 1812.

Upon executing in "generic_preprocessor" 1500, the executable code for the generic preprocessor 1402, creates a shadow stack frame 1502 containing the instruction sequence similar to that discussed in FIG. 1600. Then the executable code pops the return "address 2" 1816 off the stack, and pops off the pointer to the parameter descriptor

1814. Finally, the executable code replaces the call stack contents of the original return address—"address 1" 1808, with the a pointer to the shadow stack frame (i.e., pSS) 1824. Thus, upon returning to execute the body of getTemperature 1406, the call stack appears as shown at 1822.

Finally, when a return instruction is encountered anywhere in the body of getTemperature 1408, the executable return instructions in getTemperature 1408, pop off the return address of the shadow stack pointer 1824, and jump to the stored return address 1824 to begin execution. Since this return address 1824 points to the sequence of instructions in the shadow stack frame, the instructions 1600 in the shadow stack frame are executed. After completing these instructions 1600, the call stack appears as shown at 1832.

Upon executing in the generic postprocessor 1700, the shadow stack frame is deleted 1704, behavioral changes specific to the wrapped function (i.e., getTemperature in this example) are executed, and the executable instructions for the return instruction in the generic postprocessor cleans up the call stack as shown at 1842. In this example, execution would continue next at "getHumidity" 608.

In this implementation, each time upon entering the generic preprocessor, a shadow stack frame is created. Thus it is possible to have a shadow stack frame created when an executing wrapped body calls another function that is wrapped with a generic wrapper function or conventional wrapper function. For example, if checkWeather is wrapped with a generic wrapper function (not shown) it can still call getTemperature which is also a wrapped function. In such a case, if an exception is thrown during execution of getTemperature, and checkWeather catches that exception, the control flow propagates as desired back through the call stack chain. Since checkWeather's shadow stack pointer (i.e., pSS) will be returned, getTemperature's shadow stack frame is cleaned automatically.

Figure 19:
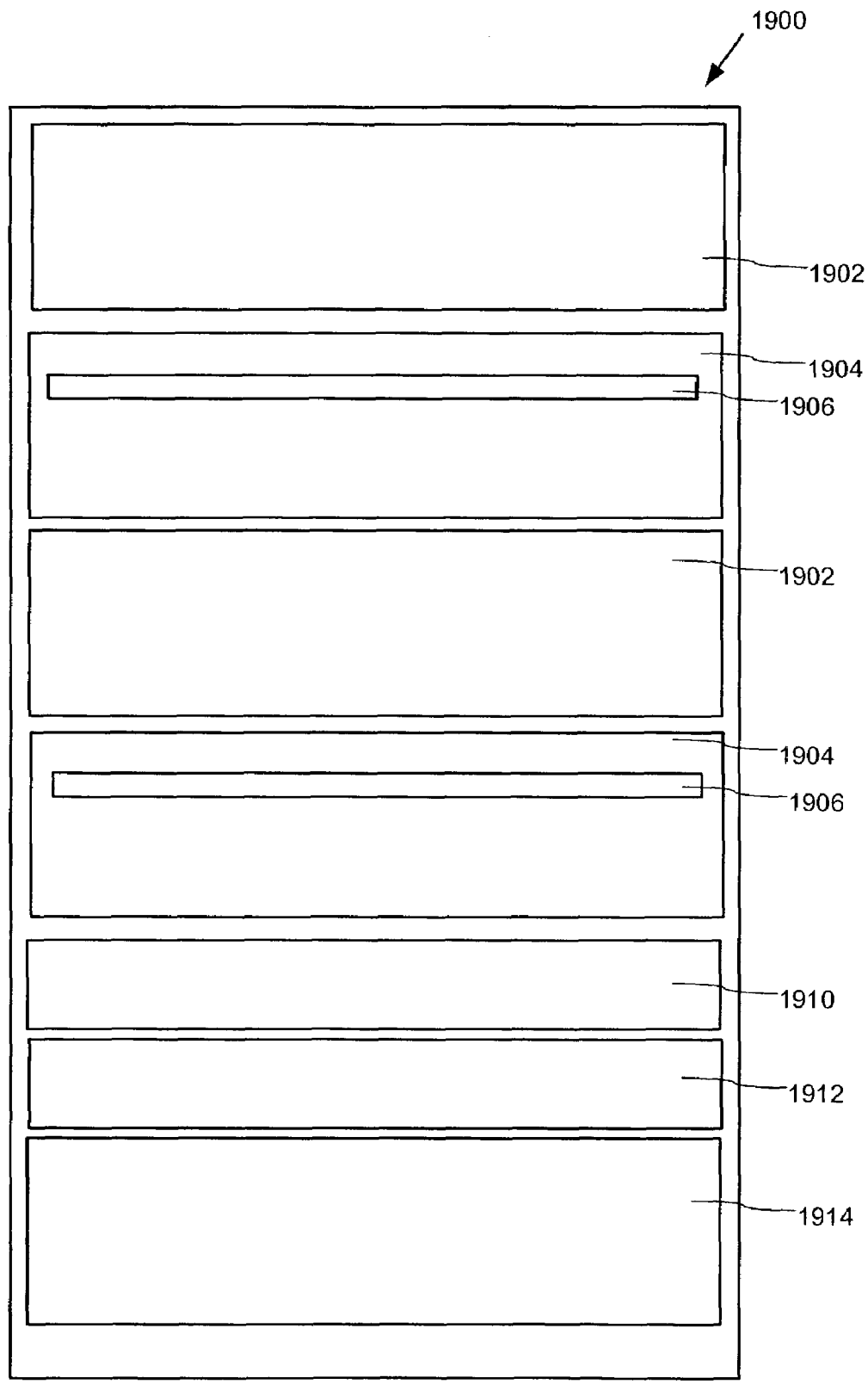
FIG. 19 is an exemplary diagram of an implementation of binary code with instrumented program using a generic preprocessor to hook for a shadow stack.

FIG. 19 is an illustration of one implementation of instrumented code using a shadow stack to hook control for a generic wrapper function. In this example, the instrumented code is a binary code 1900 containing target code of functions not selected to be instrumented 1902. The instrumented code also contains at least two functions 1904, that are instrumented. In this embodiment, each instrumented function 1904 contains a preprocessor call 1906 to a generic wrapper function 1910. When the instrumented code is produced 408, 516, the calls 1906 to the generic wrapper functions 1910, are injected into the functions selected for instrumentation 1904. Further, the generic wrapper functions are linked into the instrumented code along with tables or other storage holding the descriptor structures 1100, 1200. Thus, the pointers to the descriptor structures 918, 920 can access function and parameter information 1914 at run time. In some cases, it is best to keep this descriptor information 1914 on a heap (or other more permanent memory) so it remains available.

In this implementation, there is no postprocessing calls injected into the wrapped functions 1904, since execution is directed to postprocessing when a return instruction is encountered anywhere in the wrapped function. When such a return instruction is encountered in a wrapped function, a return address 1824 on the call stack directs control flow to postprocessing 1912.

There are other alternative ways of implementing the generic preprocessor and postprocessor function hooking. Another alternative would be to call a generic wrapper function passing the pointer to function of the original function and let the wrapper call the original function body if desired.

Figure 20:
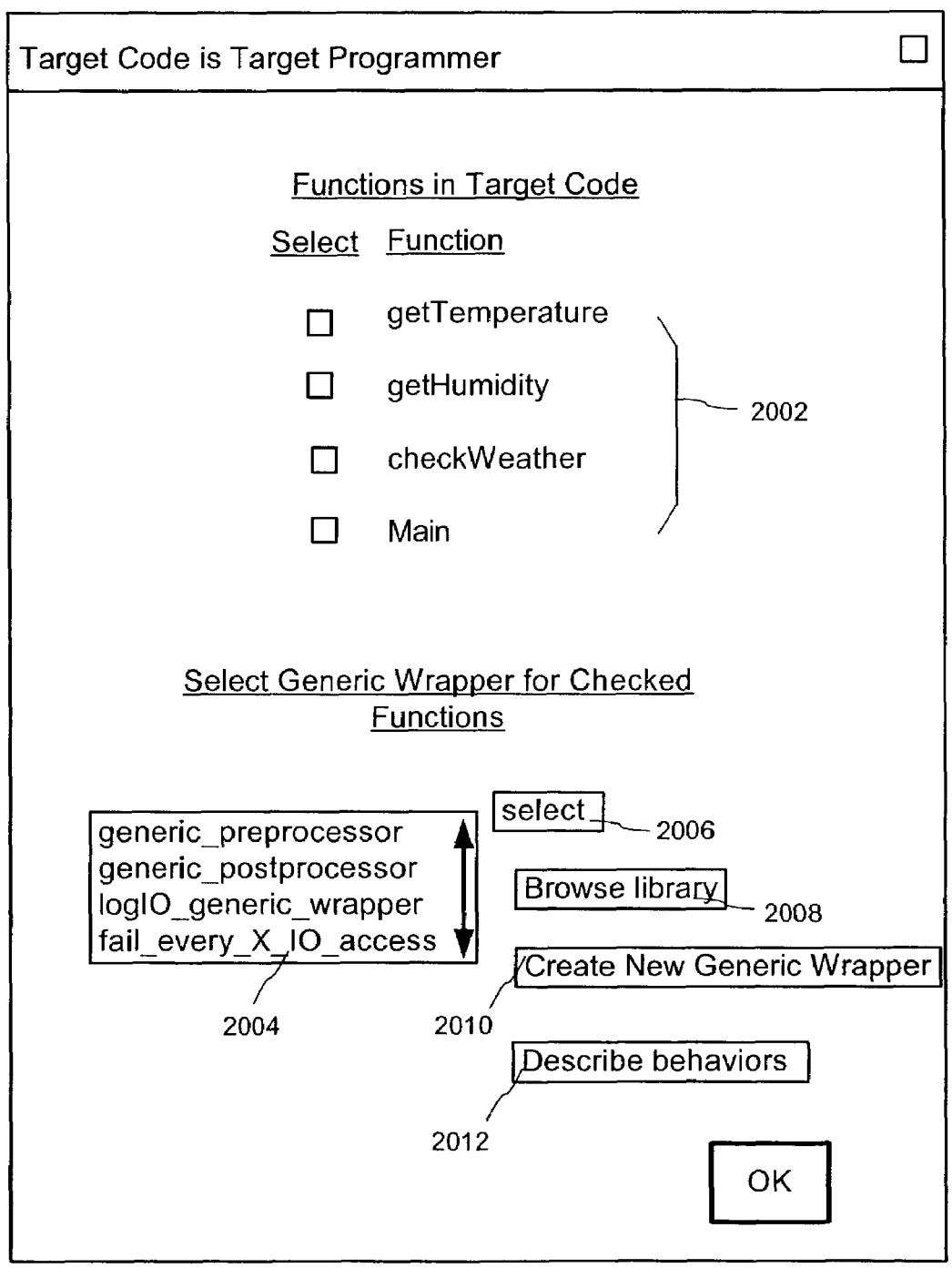
FIG. 20 is an exemplary graphical user interface used to select functions, and to select or create new generic wrapper functions.

FIG. 20 is an example user interface 2000 presenting functions in the target code 2002, and a list of available generic wrapper functions 2004 that can be used to instrument target code. A user can select generic wrapper function 2006, browse other sources of generic wrapper functions 2008, obtain more information about a generic wrapper functions available behaviors 2012, or create a new generic wrapper function. By selecting a function 2002, and selecting to create a new wrapper function 2010, a list of parameter names and types are exposed (not shown) for the selected function 2002, making coding changed behaviors much easier.

One of the potential applications of generic wrapper algorithm is buffer overrun detection. By examining all the string buffer parameters of functions in an executable, any string buffer parameter that is overrun its boundary can be detected. Another example of the potential applications is logging and tracing program execution FIG. 21 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

Figure 21:
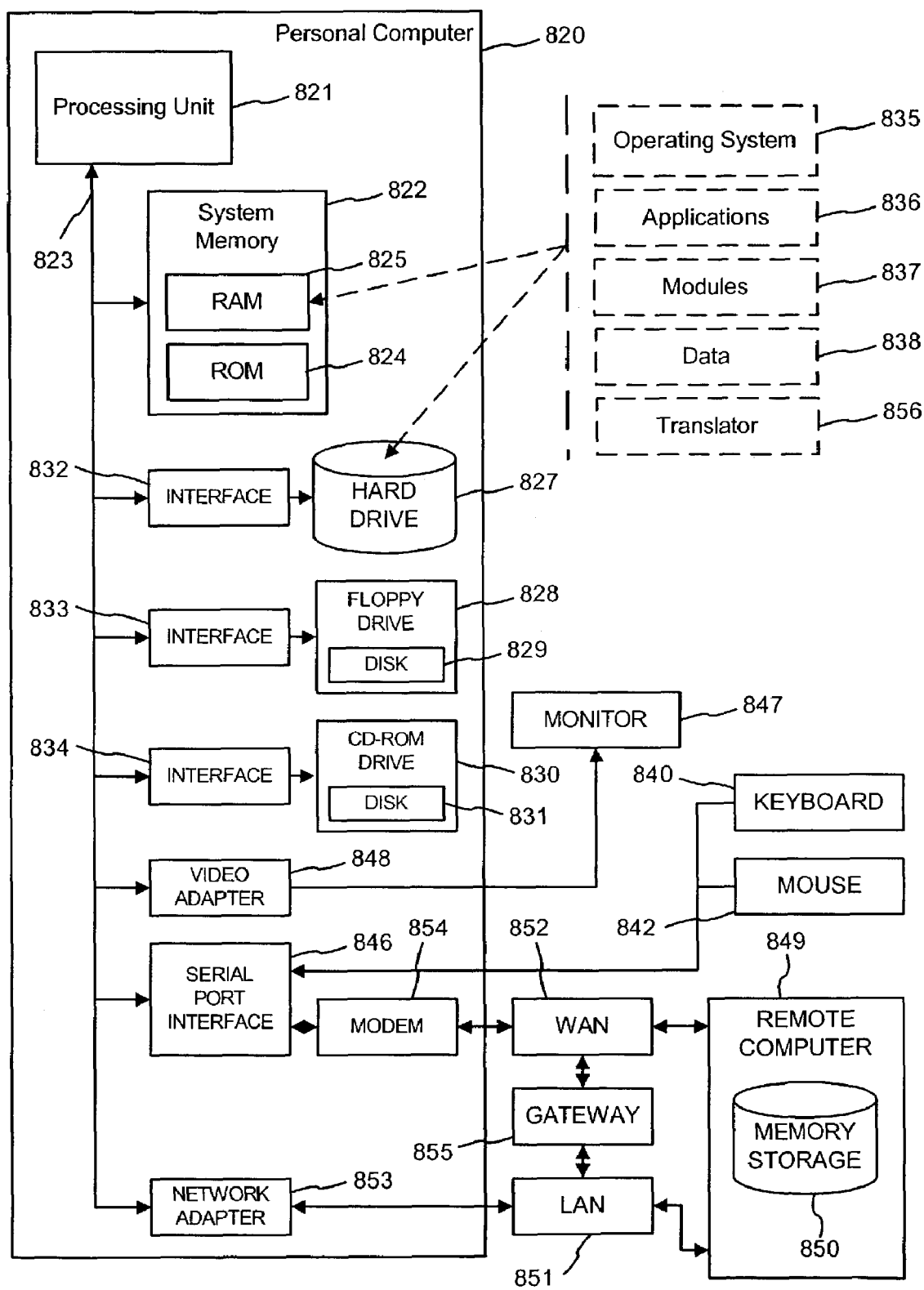
FIG. 21 is a block diagram of a computer system that may be used to implement a method, apparatus, and system embodying the described generic wrapper scheme.

With reference to FIG. 21, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer implemented method of instrumenting target code to provide changed behavior, comprising:
   receiving target code as input;
   displaying a list of functions in the target code;
   receiving an association of at least two of the functions on the list with a same generic wrapper function, wherein the generic wrapper function comprises a first behavior associated with a first one of the at least two functions and a second behavior associated with a second one of the at least two functions;
   performing an instrumentation of the target code comprising:
      creating a descriptor data structure for each of the at least two functions;
      inserting code into each of the at least two functions, the inserted code comprising a call to the generic wrapper function with a reference to the descriptor created for that function as a call parameter; and
   executing the instrumented target code, wherein an executing generic wrapper function determines which of plural behaviors to execute based on a function identifier in the descriptor.

2. The method of claim 1, wherein during execution, an inserted call to the wrapper function is executed, and code in the executing wrapper function replaces a return address on the call stack with a return address in a generic wrapper function.

3. The method of claim 2, wherein the inserted call is inserted in the control flow before an instrumented function's body, and a second generic wrapper function is inserted after the instrumented function's body but before a return instruction.

4. The method of claim 1, wherein the descriptor data structure describes a property of a parameter in the call context of the function for which it was created.

5. The method of claim 1, wherein the descriptor data structure describes properties in the call context of the function for which it was created.

6. The method of claim 1, wherein the reference is to an array of data descriptors created for the instrumented target code.

7. A method of testing target code using a generic wrapper function that performs a changed behavior, the generic wrapper function called by plural functions in the target code, the method comprising:
   receiving target code as input;
   identifying functions in the target code;
   receiving an association of a generic wrapper function with at least two of the functions in the target code, wherein the generic wrapper function comprises a first behavior associated with a first one of the at least two functions and a second behavior associated with a second one of the at least two functions;
   creating instrumented code comprising inserting code into the target code; and
   executing the instrumented code, wherein
   during execution, upon a call to one of the at least two functions, the inserted code directs execution to the generic wrapper function, and wherein the generic wrapper function determines which of the first behavior and the second behavior to execute based on a parameter property identified in one or more descriptor data structures of the at least two functions.

8. The method of claim 7, wherein the executing generic wrapper performs preprocessing comprising replacing a return address in a stack frame with a return address to a post processing behavior executed by the generic wrapper function.

9. The method of claim 8, wherein after replacing the return address, the executing generic wrapper function directs execution flow back to the instruction following the call.

10. The method of claim 9, wherein after executing plural instructions following the instruction following the call, a return instruction is executed, and the post processing behavior is executed after the return address is obtained from the stack frame.

11. The method of claim 7 wherein the call includes a reference to a data structure describing the parameters of the called function.

12. A computer system comprising:
a central processing unit coupled to memory;
plural programs comprising:
a target code;
an instrumentation program comprising:
instructions for identifying functions in the target code;
instructions for associating plural identified functions with a selected generic wrapper function, wherein the genetic wrapper function comprises a first behavior associated with a first one of the plural identified functions and a second behavior associated with a second one of the plural identified functions;
instructions for producing instrumented code comprising a call to the selected generic wrapper function from each identified function,
wherein the call comprises a descriptor describing a context of the call and a function identifier; and
instructions for executing the instrumented code and the generic wrapper function, wherein the generic wrapper function determines which of the first behavior and the second behavior to execute based on the function identifier.

13. The system of claim 12, wherein the descriptor is a data structure comprising a function name, a parameter name, a parameter type, and an address of a parameter.

14. The system of claim 12 wherein the selected generic wrapper function further comprises instructions for executing a calling function independent behavior.

15. The system of claim 14 wherein the calling function independent behavior comprises periodically throwing an exception.

16. A computer readable medium comprising:
a data structure comprising:
a parameter descriptor describing a parameter of an instrumented function;
a data type descriptor describing the data type of the parameter;
a function descriptor associating the parameter descriptor with the instrumented function; and
instructions configured to cause a computer to provide the data structure to a generic wrapper function to determine a changed behavior to implement for the instrumented function based at least in part on the function descriptor in the data structure or the parameter descriptor in the data structure, wherein the generic wrapper function comprises a first behavior associated with the instrumented function and a second behavior associated with another function.

17. The computer readable medium of claim 16 wherein the parameter descriptor is a name of a function parameter.

18. The computer readable medium of claim 16 wherein the data type descriptor is a primitive data type.

19. The computer readable medium of claim 16 wherein the function descriptor is a function string name.

20. The computer readable medium of claim 16 wherein the function descriptor is a memory location for an original function.

* * * * *